Dec. 14, 1926.
M. WINTERHALTER
FASTENING FOR WEARING APPAREL AND THE LIKE
Filed August 15, 1925
1,610,839
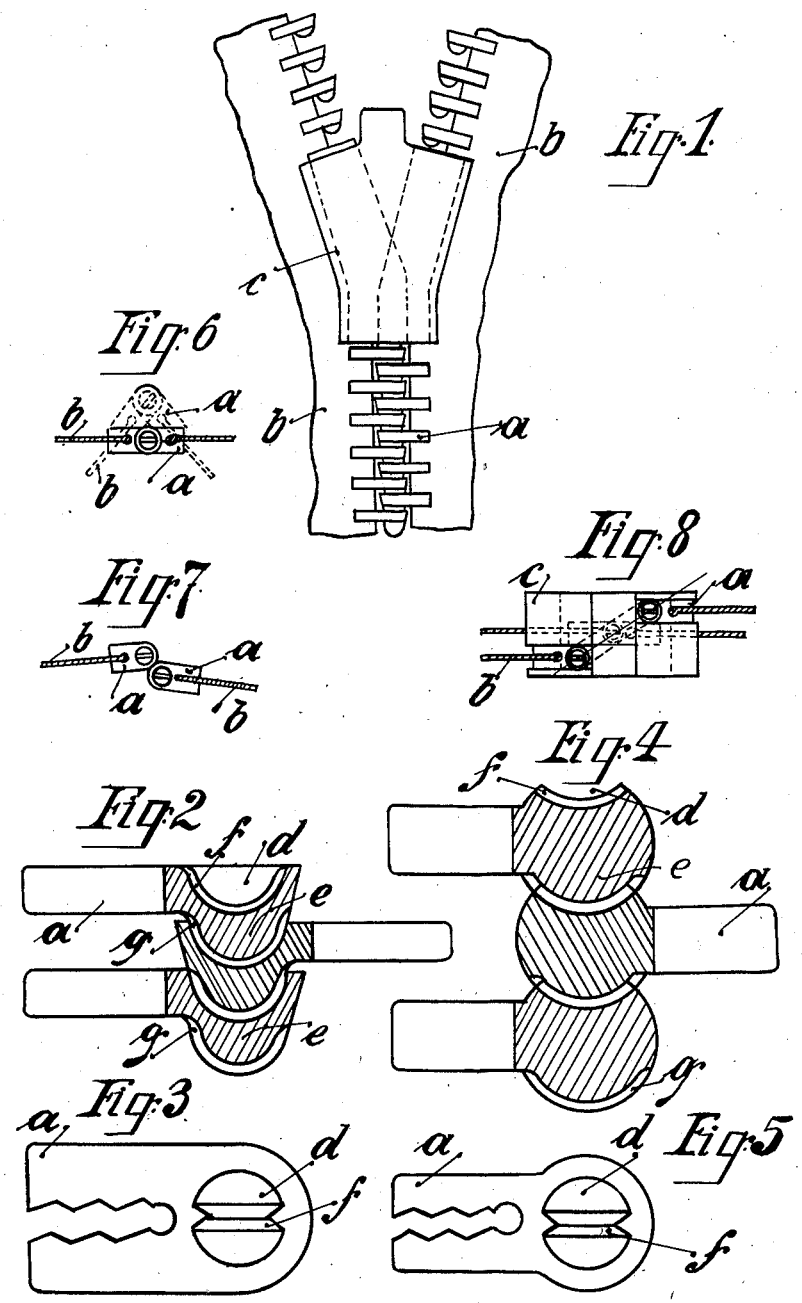
Inventor:
Martin Winterhalter.

Patented Dec. 14, 1926.

1,610,839

UNITED STATES PATENT OFFICE.

MARTIN WINTERHALTER, OF HALLE ON THE SAALE, GERMANY.

FASTENING FOR WEARING APPAREL AND THE LIKE. REISSUED

Application filed August 15, 1925, Serial No. 50,508, and in Germany November 25, 1924.

This invention relates to a fastening for wearing apparel and the like and the kind in which staggered rows of fastening members are connected to the edges to be joined and drawn into interlocking position by means of a slide.

In known fastenings of this kind, the interlocking elements are either spherical or elongated. The spherical elements have the advantage that they can be drawn together with little friction and from any direction, but, as they allow a pivotal relative adjustment of the members and as the slide requires them to be in parallel planes when the fastening is opened, a rectification of the position must take place which often renders the opening process very troublesome. The elongated interlocking elements retain the members in their correct position relative to the slide, but they must be drawn together either in longitudinal or transverse direction. This requires in both instances a bending of the edges to which considerable resistance is offered when said edges, as in the case of tents for instance, are in tension.

The object of the present invention is to produce a fastening whose members can be brought together from any direction and which at the same time are prevented, when in engagement, from pivotal relative displacement, and the invention consists in the first place in the provision of spherical interlocking elements formed with engaging ribs and grooves which prevent pivotal relative displacement. In the second place, the invention consists in the provision of a slide adapted to draw the fastening members together in a direction which lies between the longitudinal and the transverse direction of the members. By this arrangement the bending of the edges is reduced to a minimum, and the fastening members can be drawn together and disconnected with the least possible friction.

Fig. 1 of the accompanying drawings represents a view of the improved fastening showing the slide in operation.

Fig. 2 is a sectional view of the fastening on an enlarged scale, and

Fig. 3 is a plan of one of the fastening members.

Fig. 4 is a sectional view of a fastening of modified construction, and

Fig. 5 is a plan of one of the fastening members of this construction.

Fig. 6 is a view showing by dotted lines the pivotal relative displacement of the fastening members which is to be obviated by the present invention.

Fig. 7 shows the manner in which the fastening members are drawn together, and

Fig. 8 shows the same thing in connection with the slide.

The edges $b$ of sheets of fabric, leather or the like are connected in known manner by means of staggered rows of interlocking fastening members $a$ which are drawn together by means of a slide $c$. The fastening members interlock by means of heads formed so as to present a spherical projection $e$ and at the other side a spherical cavity $d$, the projection of one member being adapted to engage the cavity of the adjacent member. According to the invention, the projection $e$ is formed with a groove $g$, and the cavity with a corresponding rib $f$, or vice versa, so that relative pivotal displacement about the center of the spherical surfaces will be prevented by the engagement of the ribs with the grooves. The fastening members will thus be retained in their correct position relative to the slide $c$.

The spherical surfaces may be extended so as to form the head into a complete sphere only interrupted by the cavity $d$. The heads are shaped so as to maintain, between the bodies of adjacent members, a free space which is substantially equal to the head diameter, as shown in Fig. 4.

To obviate excessive bending of the edges $b$, the fastening members are brought together in an oblique direction, that is, at an angle lying between the longitudinal and the transverse direction of the members. For this purpose the guide channels in the slide $c$ are carried from a coinciding position at the narrow end of the slide towards diagonally opposite corners at the wide end, so that the fastening members will approach each other along a straight line from the position shown by full lines in Fig. 8 to the position shown by dotted lines.

I claim:

1. A fastening for wearing apparel and the like comprising staggered rows of fastening members connected to the edges to be joined and adapted to mesh and interlock, each member being formed with interlocking means in the form of a spherical head and with a spherical recess in said head, the heads being formed with intermeshing ribs and grooves which break the continuity of the spherical surfaces of said head and recess so as to prevent pivotal relative displacement of the members, and a slide for guiding the members successively into and out of engagement with each other.

2. A fastening according to claim 1 in which the heads are shaped so as to maintain between the bodies of adjacent members a free space which is substantially equal to the head diameter.

3. A fastening according to claim 1 in which the slide is formed with channels in which the fastening members are guided, said channels being carried from a coinciding position at one end of the slide towards diagonally opposite corners at the other end of the slide, so as to bring the fastening members together at an angle lying between the longitudinal and the transverse direction of the same.

Dr. MARTIN WINTERHALTER.